US012578465B2

(12) United States Patent
Laboe et al.

(10) Patent No.: US 12,578,465 B2
(45) Date of Patent: Mar. 17, 2026

(54) SYNTHETIC APERTURE SONAR (SAS) PROCESSING SYSTEM WITH MULTI-ASPECT IMAGING FOR ACOUSTIC IDENTIFICATION

(71) Applicant: Raytheon Company, Arlington, VA (US)

(72) Inventors: Nicholas J. Laboe, North Kingstown, RI (US); Andrew D. Wilby, Warwick, RI (US); Abigail R. Keith, Assonet, MA (US); Kevin P. Bongiovanni, Portsmouth, RI (US)

(73) Assignee: Raytheon Company, Arlington, VA (US)

( * ) Notice: Subject to any disclaimer, the term of this patent is extended or adjusted under 35 U.S.C. 154(b) by 49 days.

(21) Appl. No.: 18/647,851

(22) Filed: Apr. 26, 2024

(65) Prior Publication Data

US 2025/0334693 A1      Oct. 30, 2025

(51) Int. Cl.
  *G01S 15/89*      (2006.01)
  *G01S 7/53*       (2006.01)
  *G01S 7/539*      (2006.01)

(52) U.S. Cl.
  CPC ............ *G01S 15/8904* (2013.01); *G01S 7/53* (2013.01); *G01S 7/539* (2013.01)

(58) Field of Classification Search
  CPC ......... G01S 15/8904; G01S 7/53; G01S 7/539
  USPC ........................................................ 367/93
  See application file for complete search history.

(56) References Cited

U.S. PATENT DOCUMENTS

| | | | | |
|---|---|---|---|---|
| 4,924,229 A | * | 5/1990 | Eichel | ................. G01S 13/9017 |
| | | | | 342/25 E |
| 5,675,550 A | | 10/1997 | Ekhaus | |
| 6,037,892 A | * | 3/2000 | Nikias | ................... G01S 13/904 |
| | | | | 367/87 |
| 7,046,582 B1 | * | 5/2006 | Kosalos | .............. G01S 7/52003 |
| | | | | 367/103 |
| 8,213,740 B1 | | 7/2012 | Rikoski | |

(Continued)

OTHER PUBLICATIONS

"International Application Serial No. PCT US2025 026254, International Search Report mailed Jul. 18, 2025", 3 pgs.

(Continued)

*Primary Examiner* — Kerri L McNally
(74) *Attorney, Agent, or Firm* — Schwegman Lundberg & Woessner, P.A.

(57)      ABSTRACT

A synthetic aperture sonar (SAS) processing system for acoustic identification and multi-aspect imaging may perform a first instance of stripmap processing on raw SAS data to generate an initial image and identify a region of interest within the initial image. A second instance of stripmap processing performed on the raw SAS data may generate higher-resolution SAS data of at least the region of interest. The second instance of stripmap processing may include performing beamforming on the higher-resolution SAS data with a full aperture to produce a closest point of approach (CPA) image with an aspect that is orthogonal to an azimuthal path. Multi-aspect processing may include performing beamforming on the higher-resolution SAS data with a series of overlapping sub-apertures to generate the multiple images of the region of interest to present the region of interest with a different aspect and in a different time window.

20 Claims, 3 Drawing Sheets

(56) References Cited

U.S. PATENT DOCUMENTS

| | | | |
|---|---|---|---|
| 8,937,849 B1 * | 1/2015 | Marston | ..................... G01S 15/89 |
| | | | 367/88 |
| 10,957,336 B2 | 3/2021 | Short et al. | |
| 11,774,588 B2 * | 10/2023 | Pollard | ..................... G01S 7/527 |
| | | | 367/88 |
| 2009/0066562 A1 * | 3/2009 | Altes | ..................... G01S 13/9029 |
| | | | 342/25 F |
| 2012/0281507 A1 * | 11/2012 | Rikoski | ..................... G01S 15/89 |
| | | | 367/88 |
| 2014/0378012 A1 | 12/2014 | Parkinson | |

OTHER PUBLICATIONS

"International Application Serial No. PCT US2025 026254, Written Opinion mailed Jul. 18, 2025", 7 pgs.

Hansen, R E, "High fidelity synthetic aperture sonar products for target analysis", Oceans 2008, IEEE, Piscataway, NJ, USA, vol. 1, Sep. 15, 2008, 7 pgs.

Midtgaard, O, "Detection of Short-Tethered Objects with Interferometric Synthetic Aperture Sonar", Oceans 2007, IEEE, Piscataway, NJ, USA, Sep. 29, 2007, 7 pgs.

Pinto, Marc A, "A New High Resolution AUV-Based Synthetic Aperture Sonar for Challenging Environmental Conditions", Oceans 2023—MTS IEEE U.S. Gulf Coast, the Marine Technology Society MTS,, Sep. 25, 2023, 5 pgs.

Plotnick, Daniel S., et al., "Utilization of Aspect Angle Information in Synthetic Aperture Images", IEEE Transactions on Geoscience and Remote Sensing, vol. 56, No. 9, (Sep. 2018), 5424-5432.

* cited by examiner

SYNTHETIC APERTURE SONAR (SAS) PROCESSING SYSTEM WITH MULTI-ASPECT IMAGING FOR ACOUSTIC IDENTIFICATION

TECHNICAL FIELD

Embodiments pertain to synthetic aperture sonar (SAS) and acoustic image generation. Some embodiments pertain to acoustic image processing. Some embodiments pertain to acoustic target identification. Some embodiments pertain to mine hunting.

BACKGROUND

Active sonar transmits a signal into the water and receives echoes from targets in the water. The targets can include, but are not limited to, submarines, torpedoes, tethered mines, bottom mines, cables, and bottom features such as hills, trenches, and the bottom surface. Active sonar systems have a variety of configurations. Bistatic active sonar systems have an acoustic transmitter separate from an acoustic receiver. Monostatic active sonar systems have an acoustic transmitter co-located with an acoustic receiver.

The acoustic receiver portion of an active sonar system can have an array of receive elements arranged in a receive array formed as a line or a curve. The receive elements may be regularly or irregularly spaced in the receive array. With this arrangement, signals provided by the receive elements can be added to provide a receive beam having a beamwidth inversely proportional to a length of the receive array. Relative time delays or relative phase shifts can be introduced to the signals provided by the receive elements to steer the receive beams about the receive array.

Where the receive array is a horizontal receive array, an azimuth width of a receive beam is inversely proportional to the length of the array in wavelengths. Therefore, high spatial resolution can be achieved either by lengthening the receive array or by increasing the frequency of operation. However, physical array length is often limited by a size of a platform to which the receive array is attached. Furthermore, high acoustic frequencies attenuate rapidly in the water, preventing acoustic propagation to long ranges. As a result, conventional active sonar systems are limited in performance by receive array length constraints and by acoustic frequency constraints.

Synthetic aperture sonar (SAS) has characteristics similar to synthetic aperture radar (SAR). SAS improves the spatial resolution of an active sonar array by combining data coherently between pings (acoustic pulses) to synthesize a longer effective array. For SAS processing, Nyquist sampling constraints require that the receive array advance (move along its axis) by no more than half the physical length of the receive array between successive pings.

SAS systems require an exceptionally good estimate of a spatial track (i.e., position or motion estimate) of the receive array with time in order to be able to accurately add signals from the receive array coherently over the entire synthetic aperture. It will be understood that a spatial track is associated with six degrees of freedom of motion of the receive array: three displacements and three rotations. Several methods are known for estimation of the track or portions of the track of the receive array in SAS processing.

SAS systems traditionally generate single static images constructed from multiple aspects over time resulting in aspect and time variant features being diminished or washed out in the final image. As a result, it is difficult to correctly identify objects on the seabed. Thus, there are general needs for systems and methods that produce improved SAS imagery, particularly SAS imagery with time-variant information to improve the probability of correct object identification.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments of a synthetic aperture sonar (SAS) processing system for acoustic identification and multi-aspect imaging are disclosed herein. In these embodiments, the SAS processing system may perform a first instance of stripmap processing on raw SAS data to generate an initial image and may identify a region of interest within the initial image. The SAS processing system may also perform a second instance of stripmap processing on the raw SAS data to generate higher-resolution SAS data of at least the region of interest. The second instance of stripmap processing may include performing beamforming on the higher-resolution SAS data with a full aperture to produce a closest point of approach (CPA) image with an aspect that is orthogonal to an azimuthal path. Multi-aspect processing may be performed on the raw SAS data to generate multiple images of the region of interest. The multi-aspect processing may include performing beamforming on the higher-resolution SAS data with a series of overlapping sub-apertures to generate the multiple images of the region of interest. Each of the multiple images may present the region of interest with a different aspect and in a different time window. These embodiments as well as others are described in more detail herein.

Some embodiments disclosed herein are directed to an improved SAS processing system. Some embodiments are directed to acoustic identification and multi-aspect imaging. In some embodiments, the SAS processing system uses stripmap processing to produce sub-aperture imagery at various aspects with respect to an object imaged on the seabed. In some of these embodiments, a sub-aperture sliding window may display the seabed from a limited range of aspect and narrowed time window relative to the full aperture. These embodiments as well as others are also described in more detail herein.

Figure 1:
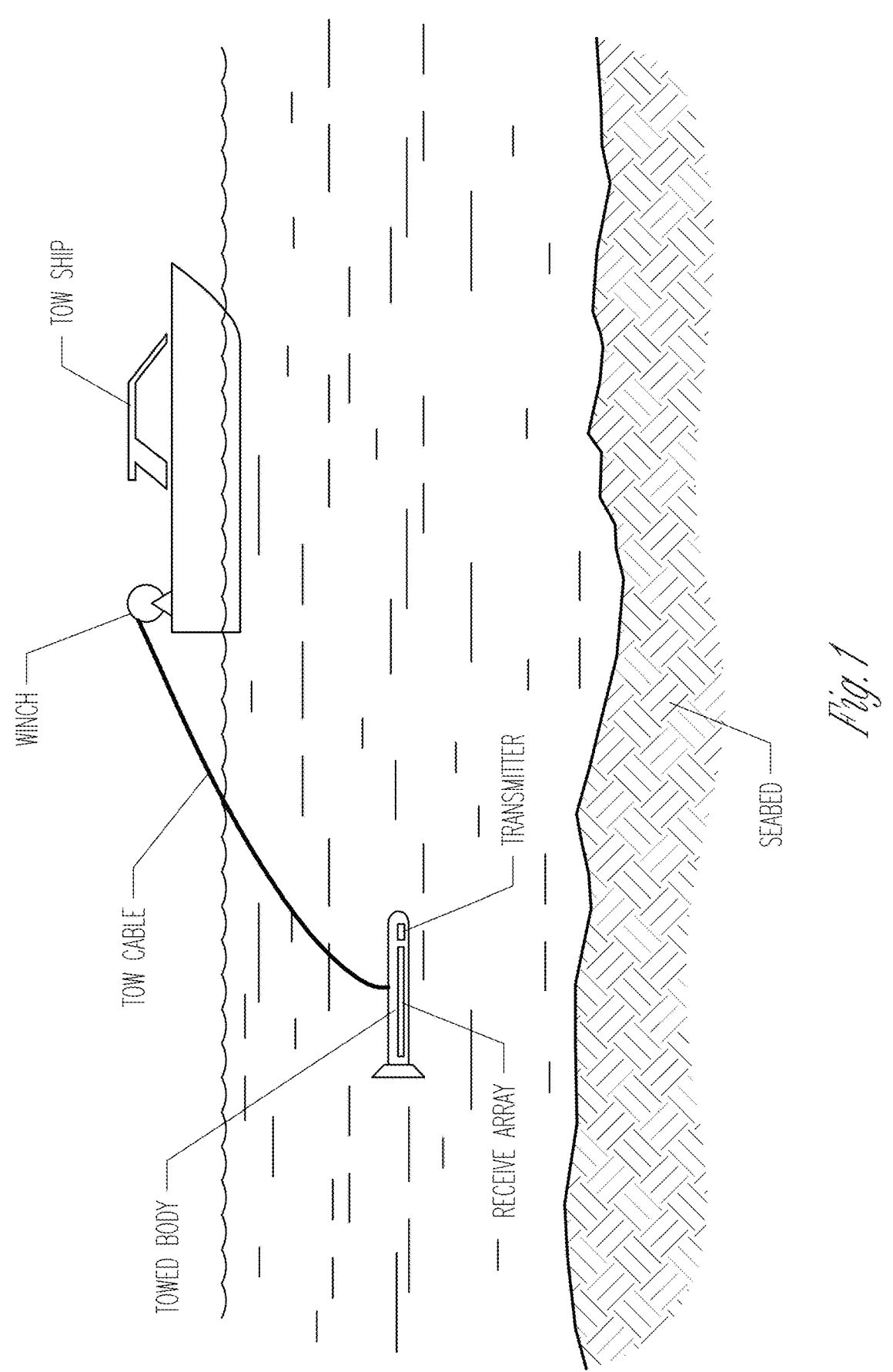
FIG. 1 illustrates the operation of a synthetic aperture sonar (SAS) system, in accordance with some embodiments.

FIG. 1 illustrates the operation of a synthetic aperture sonar (SAS) system, in accordance with some embodiments. In the SAS system illustrated in FIG. 1, a sensor may be deployed on a cable that is towed from a surface platform. The sensor tracks are generally run in a straight line. In these embodiments, the SAS system may use stripmap processing for generating raw SAS data. In these embodiments, the sensor may travel in a straight line past a target. With conventional stripmap processing, the highest resolution which can be achieved in the across track direction is determined by the bandwidth of the transmit pulse.

Embodiments disclosed herein process image data to observe the target as the vehicle approaches the target (i.e., a closet point approach (CPA)) and then as the vehicle moves away from the target. Accordingly, the target is viewed from a number of different aspects allowing the system to identify features on the target which might not be visible in a CPA image as well as features that may be obscured by the acoustic shadow of the target at CPA. Furthermore, any motion within the scene may be observed. These embodiments are described in more detail below.

Figure 2:
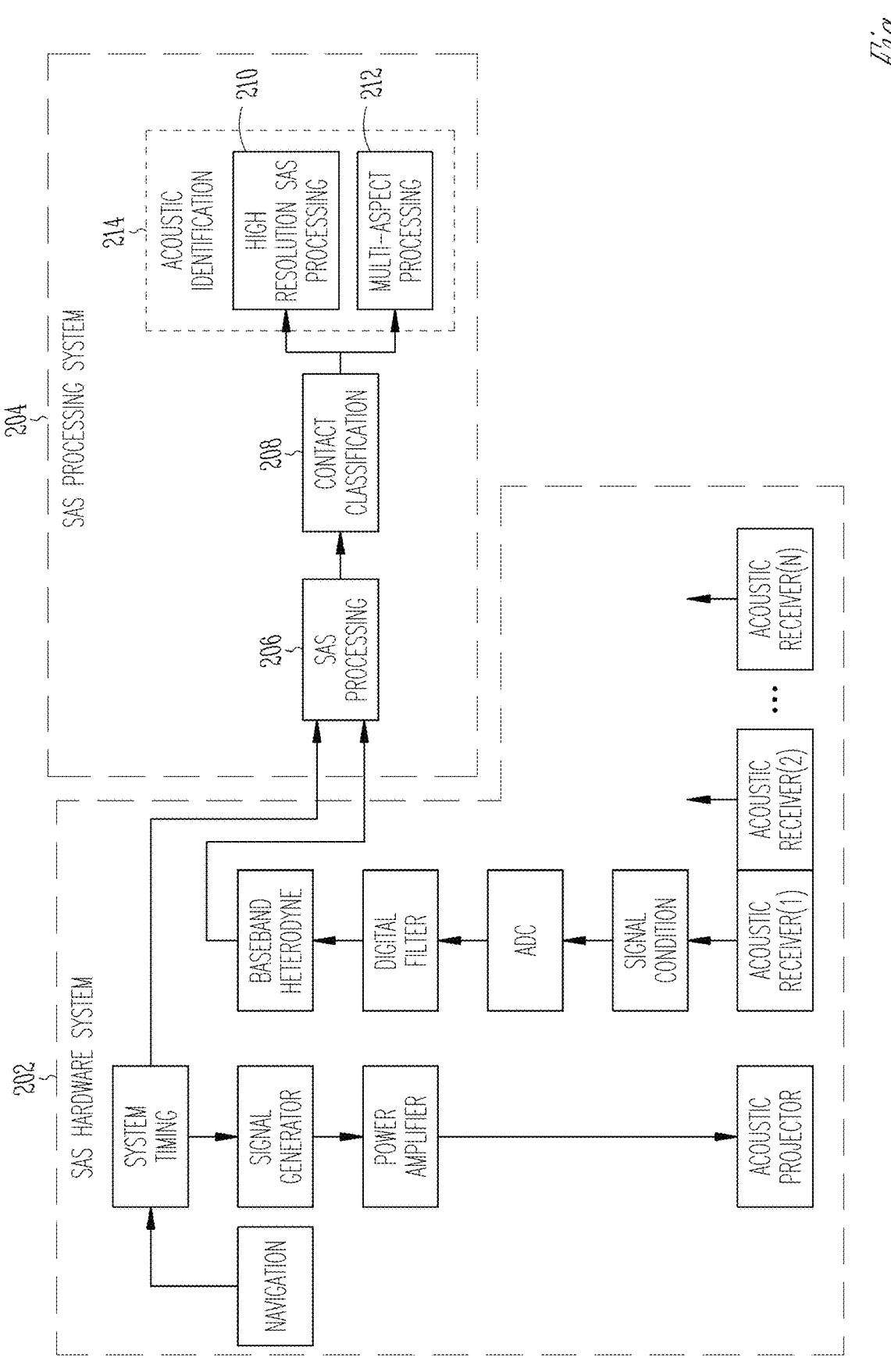
FIG. 2 is a functional block diagram of a SAS system, in accordance with some embodiments.

FIG. 2 is a functional block diagram of a SAS system, in accordance with some embodiments. The SAS system illustrated in FIG. 2 includes a SAS hardware system 202 and a SAS processing system 204. The SAS hardware system 202 may generate raw SAS data from an array for processing by SAS processing system 204. In some embodiments, the SAS hardware system 202 may reside in the towed body and the SAS processing system 204 may reside in a tow ship or other towing platform as shown in FIG. 1.

Embodiments of the SAS processing system disclosed herein may provide additional information about objects on the seabed from observation of different aspects which improves the probability of correct object identification compared to traditional synthetic aperture sonar imagery. The SAS processing system 204 may use a sub-aperture sliding window which displays the seabed from a limited range of aspect and narrowed time window relative to the full aperture. In these embodiments, the beamforming window size and window step size may be parameterized to produce the desired aspect and time increments, as well image resolution.

In these embodiments, a sliding sub-aperture process may produce a display of the seabed area and target with gradual (i.e., fine) steps in time and aspect in one pass of the SAS system by the seabed area/target. The lower resolution frames of the video sequence may present the additional aspect information as well as time-variant information (i.e., moving objects). For mine hunting applications, which may be performed by a human or automated target recognition software, the additional frames may present an unobscured view of target features in a sub-aperture frame, while those features may be washed out in a full-aperture image if moving objects (e.g., fish) are passing over the target.

In some embodiments the SAS processing system 204 may be configured for acoustic identification and multi-aspect imaging. In these embodiments, the SAS processing system 204 may comprise processing circuitry and memory configured to perform a first instance of stripmap processing in operation 206 on raw (i.e., unprocessed) SAS data to generate an initial lower-resolution seabed image. The SAS processing system 204 may identify a region of interest within the initial image in contact classification operation 208. The SAS processing system 204 may perform a second instance of stripmap processing in operation 210 on the raw SAS data to generate higher-resolution SAS data of at least the region of interest. In these embodiments, the second instance of stripmap processing may comprises performing beamforming on the higher-resolution SAS data with a full aperture to produce a CPA image with an aspect that may be orthogonal to an azimuthal path. The SAS processing system 204 may also perform multi-aspect processing in operation 212 on the raw SAS data to generate multiple images of the region of interest. In these embodiments, the multi-aspect processing may comprise performing beamforming on the higher-resolution SAS data with a series of overlapping sub-apertures to generate the multiple images of the region of interest. In these embodiments, each of the multiple images are generated to present the region of interest with a different aspect and in a different time window. The memory may be configured to store the raw SAS data.

In some embodiments, the first instance of stripmap processing comprises lower-resolution SAS processing operation 206 and includes performing SAS processing operations on raw SAS data from the entire sonar swath, the first instance of stripmap processing generating a lower resolution image comprising a single-aspect seabed image across the entire sonar swath.

Figure 3:
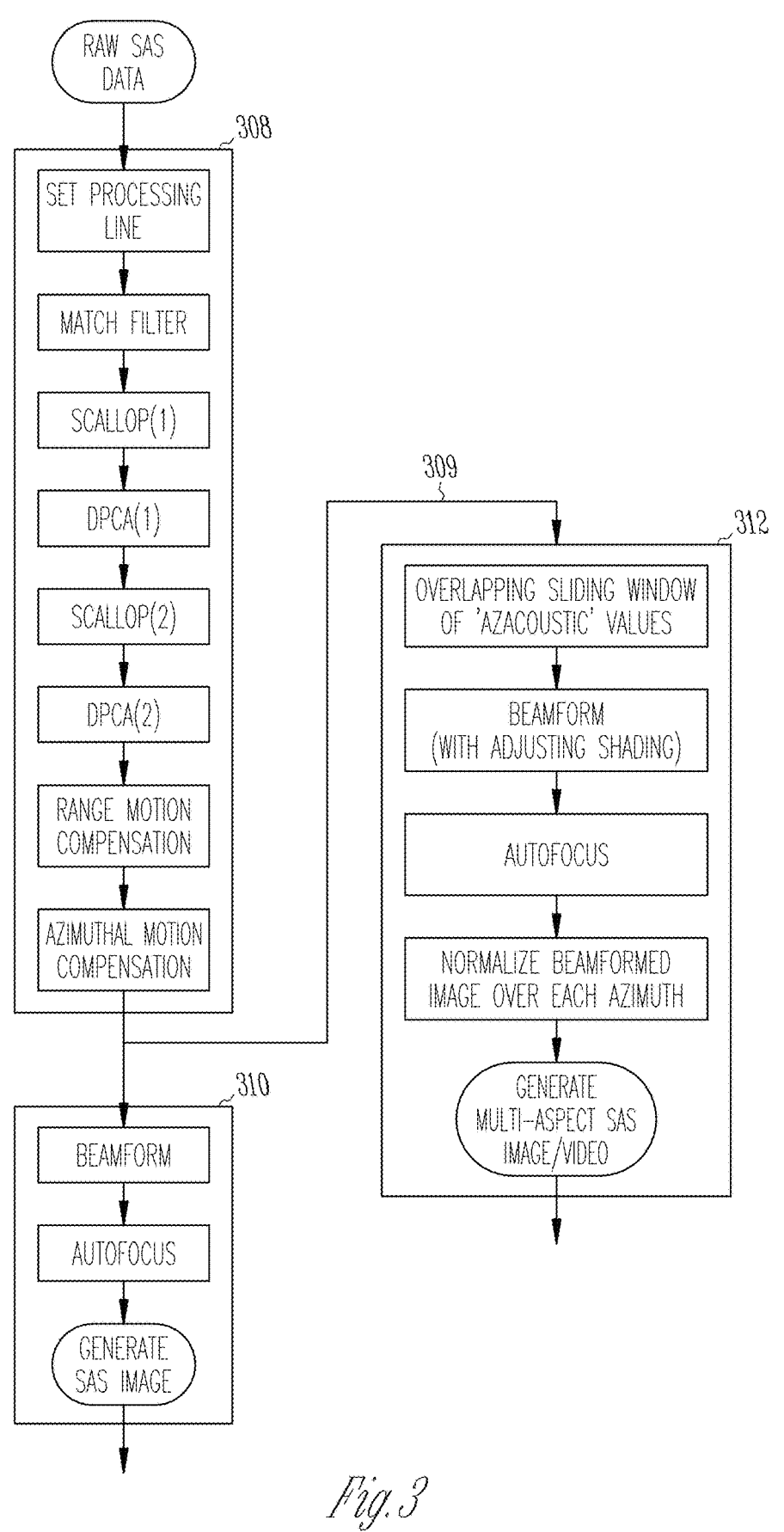
FIG. 3 illustrates SAS processing operations, in accordance with some embodiments.

In some embodiments, the second instance of stripmap processing comprises higher-resolution SAS processing operation 210 and includes performing SAS processing operations 308 and 310 on raw SAS data from the region of interest (see FIG. 3). In some embodiments, the beamforming may be performed on the higher-resolution SAS data 309 (see FIG. 3) with the series of overlapping sub-apertures in chronological order to generate the multiple images of the region of interest.

In some embodiments, the multi-aspect processing operation 212 comprises performing SAS processing operations 312 (see FIG. 3) on the higher-resolution SAS data 309 on a per-frame basis. In these embodiments, each overlapping sub-aperture of the series of overlapping sub-apertures is smaller than the full aperture used to produce the CPA image. In these embodiments, the series of overlapping sub-apertures in chronological order may comprise overlapping sliding windows.

In some embodiments, the raw SAS data may be collected by a SAS data collection device (e.g., a towed body (see FIG. 1)). In some of these embodiments, the CPA image may be generated to have an aspect that is orthogonal to an azimuthal path of the SAS data collection device. In these embodiments, the multiple images are generated by the multi-aspect processing to present the region of interest with aspects that are non-orthogonal to the azimuthal path and to present region of interest at the non-orthogonal aspects at different times. In these embodiments, the multi-aspect processing may generate sub-aperture imagery at various aspects with respect to the target imaged on the seabed. A sub-aperture sliding window displays the seabed from a broader, yet limited range of aspect and narrowed time window relative to the full aperture. The multi-aspect processing operation 212 allows the creation of a video which allows the user to effectively fly by the target, observe any motion within the scene, and observe the target from a number of different aspects and to see features on the target which might not be visible in the CPA image or might be obscured by the acoustic shadow of the target at CPA.

In some embodiments, after performing beamforming with the series of overlapping sub-apertures, the SAS processing system 204 may perform an image normalization process (e.g., for each frame of video) that comprises normalizing beam-pattern effects that vary from sub-aperture to sub-aperture. In these embodiments, each image produced per sub-aperture beamforming may be normalized. In some embodiments, the multi-aspect processing operation 212 may include generating video from the multiple images of the region of interest.

In some embodiments, the SAS processing system 204 may be configured to perform acoustic identification operation 214 to identify or classify a target in the region of interest by processing both the CPA image generated by second instance of stripmap processing operation 210 and the multiple images generated by the multi-aspect processing operation 212. In some embodiments, the SAS processing system may be configured to display both the CPA image generated by second instance of stripmap processing operation 210 and the video generated from the multiple images generated by the multi-aspect processing operation 212. In these embodiments, a trained operator, for example, may observe the display to identify or classify a target in the region of interest.

Some embodiments are directed to a non-transitory computer-readable storage medium that stores instructions for execution by processing circuitry of a SAS processing system for acoustic identification and multi-aspect imaging. In these embodiments, the processing circuitry may perform a first instance of stripmap processing on raw SAS data to generate an initial lower-resolution seabed image; may identify a region of interest within the initial image; and may perform a second instance of stripmap processing operation 210 on the raw SAS data to generate higher-resolution SAS data 309 of at least the region of interest. In these embodiments, the second instance of stripmap processing may comprise performing beamforming on the higher-resolution SAS data with a full aperture to produce a CPA image with an aspect that may be orthogonal to an azimuthal path. In these embodiments, the processing circuitry may perform multi-aspect processing on the raw SAS data to generate multiple images of the region of interest. In these embodiments, the multi-aspect processing may comprise performing beamforming on the higher-resolution SAS data with a series of overlapping sub-apertures to generate the multiple images of the region of interest. Each of the multiple images may be generated to present the region of interest with a different aspect and in a different time window.

Some embodiments are directed to a method for acoustic identification and multi-aspect imaging performed by processing circuitry of a SAS processing system. In these embodiments, the method may comprise performing a first instance of stripmap processing on raw (i.e., unprocessed) SAS data to generate an initial lower-resolution seabed image, identifying contact classification operation 208 a region of interest within the initial image, and performing a second instance of stripmap processing operation 210 on the raw SAS data to generate higher-resolution SAS data 309 of at least the region of interest. The second instance of stripmap processing may comprise performing beamforming on the higher-resolution SAS data with a full aperture to produce a CPA image with an aspect that may be orthogonal to an azimuthal path. The method may also include performing multi-aspect processing on the raw SAS data to generate multiple images of the region of interest. The multi-aspect processing may comprise performing beamforming on the higher-resolution SAS data with a series of overlapping sub-apertures to generate the multiple images of the region of interest. Each of the multiple images may be generated to present the region of interest with a different aspect and in a different time window.

FIG. 3 illustrates SAS processing operations, in accordance with some embodiments. The SAS processing operations illustrated in FIG. 3 may be performed by processing circuitry that may comprise one or more processors or processing systems, such as SAS processing system 204 (FIG. 2). As illustrated in FIG. 3, SAS processing operations 308 may be performed on raw SAS data to generate higher-resolution SAS data 309 and SAS processing operations 310 and multi-aspect processing operations 312 may be performed on the higher-resolution SAS data 309.

In these embodiments, a conventional SAS processor, using the summed elements of the array may perform operations 308 and 310 to create a lower resolution image of the seabed, across the full swath (i.e., because the element were summed). After observing a target using this lower resolution system, data may be extracted from individual un-summed elements in the region surrounding an object of interest (e.g., extending a little before and after in range and in azimuth extending out beyond the aperture of beamwidth of the single element.) This data may be processed in operations 308 and 310 to create a higher resolution still image of the object of interest. In these embodiments, the higher-resolution SAS data 309 generated by operations 308 may be processed through multi-aspect processing operations 312 to create a multi-aspect video of the object of interest. In some embodiments, both the higher resolution still image and the multi-aspect video may be analyzed, for example by a trained operator or image identification software.

It should be noted that the array does not travel through the water in a perfectly straight line. The wavelength of the acoustic signal in systems such as these is typically in the 2-3 mm to 10 mm range and to adequately focus an image, the position of the array needs to be known to within a small fraction of a wavelength. There are no underwater navigation sensors which are capable of maintaining this level of precision. One objective in the SAS preprocessing stage is to use the data overlap from subsequent transmissions to understand the motion of the array and to then interpolate the received data onto a regular grid to allow the efficient frequency domain beamforming of element data into an image.

Set Processing Line: In this operation, when raw SAS data is received from the array, the nominal path of the array is known from the system navigator. Based on this data, a line in space is generated and used as an axis for regularly gridded data. The line may be somewhat arbitrary but may more-or-less follow the path of the towed vehicle.

Match Filter: In the across track direction, data resolution may be determined by the bandwidth of the transmit pulse. FM sweeps across the band of operation may allow energy. In this operation, the receive signal may be compressed through a process of correlation with a conjugate of the transmit waveform to produce an across track line of data with the required resolution.

Scallop: When the transmit pulse was sent into the water, the transmitter was at a specific location, probably near, but not necessarily on the processing line. The receiver is moving through the water and is therefore at a different position for each time after the transmit pulse was put in the water.

In this operation, a correction may be applied to the receive data such that to correct for the differences in these positions and for their motion over time, to a create a data set equivalent to that which would have been produced by a transmitter and receiver which were on the processing line, at a point which can be projected orthogonal to the processing line and which passes through at the midpoint between the transmitter and receiver, at the time of transmission from the array.

DPCA 1: Displaced Phase Center Alignment (DCPA) is a process by which data from successive pings is cross correlated to allow the accurate measurement of cross track motion between successive pings. The result of this process is a significantly improved estimation of the across track motion of the vehicle than was obtained from navigation.

Scallop 2: In this operation, the scallop process is repeated (i.e., re-scallop) using the updated information about array motion within the frame using the new improved position estimates obtained from the prior DPCA process (DCPA 1).

DPCA2: In this operation, the DPCA process may be repeated to check data now it has been better corrected to the processing line and any observed differences are expected to be small.

Range Motion Compensation: In this operation, an interpolation process is applied in the across track direction to compensate for any residual errors noted in DPCA2.

Azimuthal Motion Compensation: In this point in the processing, range lines are equally gridded onto the processing lines in the across track direction. However, the lines may not be equally gridded in the track direction. In this operation, azimuthal motion compensation may be performed to interpolate data in the track direction to place data onto a rectangular grid. The grid may represent fast time vs slow time and may comprise aligned phase data around the target.

Beamform: In this operation, a frequency domain beamformer applied to create an image of the seabed. In some embodiments, a Seismic Beamforming Algorithm may be used.

Autofocus: Small errors in motion compensation or in the estimation of the along track speed of the vehicle can lead to lack of focus in the final image. In this operation, a Phase Gradient Autofocus process may be performed to look for phase gradients surrounding bright points in the image and applies corrections to the whole image to correct for these areas of defocus creating the final image product.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A synthetic aperture sonar (SAS) processing system for acoustic identification and multi-aspect imaging, the SAS processing system comprising: processing circuitry and memory, the processing circuitry configured to:
    perform a first instance of stripmap processing on raw SAS data to generate an initial image;
    identify a region of interest within the initial image;
    perform a second instance of stripmap processing on the raw SAS data to generate higher-resolution SAS data of at least the region of interest, the second instance of stripmap processing comprises performing beamforming on the higher-resolution SAS data with a full aperture to produce a closest point of approach (CPA) image with an aspect that is orthogonal to an azimuthal path; and
    perform multi-aspect processing on the raw SAS data to generate multiple images of the region of interest, the multi-aspect processing comprising performing beamforming on the higher-resolution SAS data with a series of overlapping sub-apertures to generate the multiple images of the region of interest,
    wherein each of the multiple images are generated to present the region of interest with a different aspect and in a different time window.

2. The SAS processing system of claim 1, wherein the first instance of strip map processing comprises lower-resolution SAS processing, the first instance of stripmap processing generating a lower resolution image comprising a single-aspect seabed image across an entire sonar swath.

3. The SAS processing system of claim 2, wherein the second instance of stripmap processing comprises higher-resolution SAS processing and includes performing SAS processing operations on raw SAS data from the region of interest.

4. The SAS processing system of claim 3, wherein the beamforming is performed on the higher-resolution SAS data with the series of overlapping sub-apertures in chronological order to generate the multiple images of the region of interest.

5. The SAS processing system of claim 4, wherein the multi-aspect processing comprises performing SAS processing operations on the higher-resolution SAS data on a per-frame basis,
    wherein each overlapping sub-aperture of the series of overlapping sub-apertures is smaller than the full aperture used to produce the CPA image, and
    wherein the series of overlapping sub-apertures in chronological order comprise overlapping sliding windows.

6. The SAS processing system of claim 5, wherein the raw SAS data is collected by a SAS data collection device,
    wherein the CPA image is generated to have an aspect that is orthogonal to an azimuthal path of the SAS data collection device, and
    wherein the multiple images are generated to present the region of interest with aspects that are non-orthogonal to the azimuthal path and to present region of interest at the non-orthogonal aspects at different times.

7. The SAS processing system of claim 6, wherein after performing beamforming with the series of overlapping sub-apertures, the processing circuitry is further configured to perform an image normalization process that comprises normalizing beam-pattern effects that vary from sub-aperture to sub-aperture.

8. The SAS processing system of claim 7, wherein the multi-aspect processing further comprises generating video from the multiple images of the region of interest.

9. The SAS processing system of claim 8, wherein the processing circuitry is configured to perform acoustic identification to identify or classify a target in the region of interest by processing both the CPA image generated by second instance of stripmap processing and the multiple images generated by the multi-aspect processing.

10. The SAS processing system of claim 8, wherein the processing circuitry is configured to display both the CPA image generated by second instance of stripmap processing and the video generated from the multiple images generated by the multi-aspect processing.

11. A non-transitory computer-readable storage medium that stores instructions for execution by processing circuitry of a synthetic aperture sonar (SAS) processing system for acoustic identification and multi-aspect imaging, the processing circuitry configured to:

perform a first instance of stripmap processing on raw SAS data to generate an initial image;

identify a region of interest within the initial image;

perform a second instance of stripmap processing on the raw SAS data to generate higher-resolution SAS data of at least the region of interest, the second instance of stripmap processing comprises performing beamforming on the higher-resolution SAS data with a full aperture to produce a closest point of approach (CPA) image with an aspect that is orthogonal to an azimuthal path; and perform multi-aspect processing on the raw SAS data to generate multiple images of the region of interest, the multi-aspect processing comprising performing beamforming on the higher-resolution SAS data with a series of overlapping sub-apertures to generate the multiple images of the region of interest, wherein each of the multiple images are generated to present the region of interest with a different aspect and in a different time window.

12. The non-transitory computer-readable storage medium of claim 11, wherein the first instance of strip map processing comprises lower-resolution SAS processing, the first instance of stripmap processing generating a lower resolution image comprising a single-aspect seabed image across an entire sonar swath.

13. The non-transitory computer-readable storage medium of claim 12, wherein the second instance of stripmap processing comprises higher-resolution SAS processing and includes performing SAS processing operations on raw SAS data from the region of interest.

14. The non-transitory computer-readable storage medium of claim 13, wherein the beamforming is performed on the higher-resolution SAS data with the series of overlapping sub-apertures in chronological order to generate the multiple images of the region of interest.

15. The non-transitory computer-readable storage medium of claim 14, wherein the multi-aspect processing comprises performing SAS processing operations on the higher-resolution SAS data on a per-frame basis, wherein each overlapping sub-aperture of the series of overlapping sub-apertures is smaller than the full aperture used to produce the CPA image, and wherein the series of overlapping sub-apertures in chronological order comprise overlapping sliding windows.

16. The non-transitory computer-readable storage medium of claim 15, wherein the raw SAS data is collected by a SAS data collection device, wherein the CPA image is generated to have an aspect that is orthogonal to an azimuthal path of the SAS data collection device, and wherein the multiple images are generated to present the region of interest with aspects that are non-orthogonal to the azimuthal path and to present region of interest at the non-orthogonal aspects at different times.

17. The non-transitory computer-readable storage medium of claim 16, wherein after performing beamforming with the series of overlapping sub-apertures, the processing circuitry is further configured to perform an image normalization process that comprises normalizing beam-pattern effects that vary from sub-aperture to sub-aperture.

18. The non-transitory computer-readable storage medium of claim 17, wherein the multi-aspect processing further comprises generating video from the multiple images of the region of interest.

19. A method for acoustic identification and multi-aspect imaging performed by processing circuitry of a synthetic aperture sonar (SAS) processing system, the method comprising:

performing a first instance of stripmap processing on raw SAS data to generate an initial image;

identifying a region of interest within the initial image;

performing a second instance of stripmap processing on the raw SAS data to generate higher-resolution SAS data of at least the region of interest, the second instance of stripmap processing comprises performing beamforming on the higher-resolution SAS data with a full aperture to produce a closest point of approach (CPA) image with an aspect that is orthogonal to an azimuthal path; and performing multi-aspect processing on the raw SAS data to generate multiple images of the region of interest, the multi-aspect processing comprising performing beamforming on the higher-resolution SAS data with a series of overlapping sub-apertures to generate the multiple images of the region of interest, wherein each of the multiple images are generated to present the region of interest with a different aspect and in a different time window.

20. The method of claim 19, wherein the first instance of strip map processing comprises lower-resolution SAS processing, the first instance of stripmap processing generating a lower resolution image comprising a single-aspect seabed image across an entire sonar swath, and wherein the second instance of stripmap processing comprises higher-resolution SAS processing and includes performing SAS processing operations on raw SAS data from the region of interest.

* * * * *